US008965744B2

(12) United States Patent
Da Veiga et al.

(10) Patent No.: US 8,965,744 B2
(45) Date of Patent: Feb. 24, 2015

(54) METHOD OF DEVELOPING A PETROLEUM RESERVOIR BY RESERVOIR MODEL RECONSTRUCTION

(75) Inventors: Sébastien Da Veiga, Paris (FR); Mickaële Le Ravalec, Rueil Malmaison (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 1130 days.

(21) Appl. No.: 12/951,186

(22) Filed: Nov. 22, 2010

(65) Prior Publication Data
US 2011/0125469 A1  May 26, 2011

(30) Foreign Application Priority Data

Nov. 26, 2009 (FR) .................................. 09 05681

(51) Int. Cl.
*G06G 7/48* (2006.01)
*G01V 11/00* (2006.01)
*G01V 1/30* (2006.01)

(52) U.S. Cl.
CPC .......... *G01V 11/00* (2013.01); *G01V 2210/614* (2013.01); *G01V 2210/6122* (2013.01); *G01V 1/306* (2013.01); *G01V 2210/61* (2013.01);
(Continued)

(58) Field of Classification Search
CPC ................ G01V 2210/665; G01V 2210/6652; G01V 2210/61; G01V 2210/60; G01V 2210/6122; G01V 2210/614; G01V 1/306
USPC .......................................................... 703/10
See application file for complete search history.

(56) References Cited

U.S. PATENT DOCUMENTS

| 5,416,750 A | * | 5/1995 | Doyen et al. | ..................... 367/73 |
| 5,838,634 A | * | 11/1998 | Jones et al. | ..................... 367/73 |
| 7,079,953 B2 | * | 7/2006 | Thorne et al. | ................... 702/16 |

(Continued)

FOREIGN PATENT DOCUMENTS

| EP | 2 034 130 A2 | 3/2009 |
| FR | 2 869 421 | 5/2008 |

OTHER PUBLICATIONS

Le Ravalec-Dupin, M. et al: "Reconstruction of Existing Reservoir Model for Its Calibration to Dynamic Data", Earth Science Frontiers, vol. 15, No. 1, Jan. 1, 2008, pp. 176-186 XP022634281.

(Continued)

*Primary Examiner* — Akash Saxena
(74) *Attorney, Agent, or Firm* — Antonelli, Terry, Stout & Kraus, LLP.

(57) ABSTRACT

A method of developing a petroleum reservoir according to a given development scheme, from a facies map representative of the reservoir. New measurements are taken in the reservoir to better characterize it. A geostatistical simulator is selected. A set of random numbers is then identified which are provided to the geostatistical simulator to provide a facies representation identical to the initial map by inverting a random number generation algorithm of the simulator. The map is then modified to account for the new measurements, by carrying out a geostatistical simulation constrained by the measurements, with the geostatistical simulator and the set of random numbers. Finally, the reservoir development scheme is modified by accounting for the modified map, and the reservoir is developed using the modified development scheme.

4 Claims, 3 Drawing Sheets

(52) U.S. Cl.
CPC ....... *G01V 2210/60* (2013.01); *G01V 2210/665* (2013.01)
USPC ................................................ 703/10; 703/2

(56) References Cited

U.S. PATENT DOCUMENTS

| | | | | |
|---|---|---|---|---|
| 7,200,533 | B2* | 4/2007 | Hu et al. ........................... | 703/2 |
| 7,363,163 | B2* | 4/2008 | Le Ra Valec-Dupin et al. ........................... | 702/12 |
| 7,392,166 | B2* | 6/2008 | Le Ravalec-Dupin et al. . | 703/10 |
| 7,516,055 | B2* | 4/2009 | Strebelle ......................... | 703/10 |
| 7,558,715 | B2* | 7/2009 | Schaaf et al. ................... | 703/10 |
| 8,065,124 | B2* | 11/2011 | Xu et al. ........................... | 703/2 |
| 8,874,419 | B2* | 10/2014 | Da Veiga et al. ............... | 703/10 |
| 2002/0159617 | A1* | 10/2002 | Hu ................................ | 382/109 |
| 2003/0028325 | A1* | 2/2003 | Roggero et al. ................ | 702/11 |
| 2005/0015226 | A1* | 1/2005 | Le Ravalec-Dupin et al. ... | 703/2 |
| 2006/0041409 | A1* | 2/2006 | Strebelle et al. ................ | 703/10 |
| 2006/0041410 | A1* | 2/2006 | Strebelle ......................... | 703/10 |
| 2006/0052938 | A1* | 3/2006 | Thorne et al. ................... | 702/11 |
| 2006/0149520 | A1* | 7/2006 | Le Ravalec-Dupin et al. . | 703/10 |
| 2006/0241920 | A1* | 10/2006 | Le Ravalec-Dupin et al. ... | 703/2 |
| 2006/0241925 | A1* | 10/2006 | Schaaf et al. ................... | 703/10 |
| 2007/0005253 | A1* | 1/2007 | Fornel et al. .................... | 702/14 |
| 2007/0027666 | A1* | 2/2007 | Frankel ........................... | 703/10 |
| 2007/0055447 | A1* | 3/2007 | Mickaele et al. ................ | 702/7 |
| 2007/0156341 | A1* | 7/2007 | Langlais et al. ................ | 702/11 |
| 2008/0162093 | A1* | 7/2008 | Nivlet et al. ..................... | 703/2 |
| 2009/0070086 | A1 | 3/2009 | Le Ravalec et al. | |
| 2011/0231164 | A1* | 9/2011 | Zhang et al. ..................... | 703/2 |
| 2011/0282635 | A1* | 11/2011 | Liu et al. .......................... | 703/2 |
| 2011/0308792 | A1* | 12/2011 | Le Ravalec et al. ..... | 166/250.01 |
| 2013/0054201 | A1* | 2/2013 | Posamentier et al. ........... | 703/2 |
| 2013/0297272 | A1* | 11/2013 | Sung et al. ...................... | 703/10 |
| 2013/0338978 | A1* | 12/2013 | Zhang et al. ..................... | 703/2 |

OTHER PUBLICATIONS

Galli, A. et al: "The Pros and Cons of the Truncated Gaussian Method," *Geostatistical Simulations*, pp. 217-233, 1994.

Le Loc'h, G. et al: 1996 "Truncated Plurigaussian Method: Theoretical and Practical Point of View," *Geostatistics Wollongong '96* 1, E.Y. Baafi and N.A. Schofields eds, Kluwe, 211-222.

Le Ravalec, M., et al: "The FFT Moving Average (FFT-MA) Generator: An Efficient Numerical Method for Generating and Conditioning Gaussian Simulations," *Mathematical Geology*, vol. 32, No. 6, 2000, p. 701-723.

Freulon, Xavier et al: "Conditioning a Gaussian Model with Inequalities," in *Geostatistics Troia '92*, A. Soares, ed., Kluwer Academic Publishers, Dordrecht, The Netherlands, pp. 201-212 (1993).

Geweke, J.: "Efficient Simulation from the Multivariate Normal and Student t-distribution Subject to Linear Constraints," *Computer Science and Statistics: Proceedings of the Twenty-Third Symposium on the Interface*(1991), pp. 571-578.

Fernández, Pedro J, et al: "Perfectly Random Sampling of Truncated Multinormal Distributions," *Adv. In Appl. Probab*, 39 (2007) 973-990.

Hu, Lin Y.: "Gradual Deformation and Iterative Calibration of Gaussian-related Stochastic Models," *Math. Geol.*, 32(1), 87-108, Jan. 2000.

Le Ravalec-Dupin et al: "Conditioning to Dynamic Data: An Improved Zonation Approach," *Petroleum Geosciences*, 7, S9-S16, 2001.

Dempster, A. P. et al: "Maximum Likelihood from Incomplete Data via the EM Algorithm," Journal of the Royal Statistical Society, Series B 39(1) (1977), pp. 1-38.

* cited by examiner

METHOD OF DEVELOPING A PETROLEUM RESERVOIR BY RESERVOIR MODEL RECONSTRUCTION

BACKGROUND OF THE INVENTION

1. Field of the Invention

The present invention relates to the petroleum industry, and more particularly to petroleum reservoir characterization by construction of a representation of the reservoir referred to as reservoir model. In particular, the invention relates to a method of updating a reservoir model after acquiring new measurements from the petroleum reservoir.

2. Description of the Prior Art

Optimization and development of petroleum reservoirs are based on the most accurate possible description of the structure, the petrophysical properties, the fluid properties, etc., of the reservoirs. A tool accounting for these aspects in an approximate way is a reservoir model. The model is of the subsoil which is representative of both its structure and its behavior. Generally, this type of model is represented in a computer and is referred to as a numerical model.

Reservoir models are well known and widely used in the petroleum industry to determine many technical parameters relative to prospecting, study or development of a reservoir such as, for example, a hydrocarbon reservoir. In fact, a reservoir model is representative of the structure of the reservoir and of the behavior thereof. It is thus, for example, possible to determine which zones are the most likely to contain hydrocarbons, the zones in which it can be interesting/necessary to drill an injection well in order to enhance hydrocarbon recovery, the type of tools to use, the properties of the fluids used and recovered, etc. These interpretations of reservoir models in terms of "technical development parameters" are well known, even though new methods are regularly developed. It is thus crucial, in the petroleum industry, to construct a model as precisely as possible. Integration of all the available data is therefore essential.

The purpose of a reservoir model is to best account for all the information relative to a reservoir. A reservoir model is representative when a reservoir simulation provides historical data estimations that are very close to the observed data. What is referred to as historical data are the production data obtained from measurements in wells in response to the reservoir production (oil production, water production of one or more wells, gas/oil ratio (GOR), production water proportion (water cut)), and/or repetitive seismic data (4D seismic impedances in one or more regions, etc.). A reservoir simulation is a technique allowing simulation of fluid flows within a reservoir by a software based flow simulator.

History matching modifies the parameters of a reservoir model, such as permeabilities, porosities or well skins (representing damages around the well), fault connections, etc., in order to minimize differences between the simulated and measured historical data. The parameters can be linked with geographic regions, such as permeabilities or porosities around one or more wells.

Figure 1:
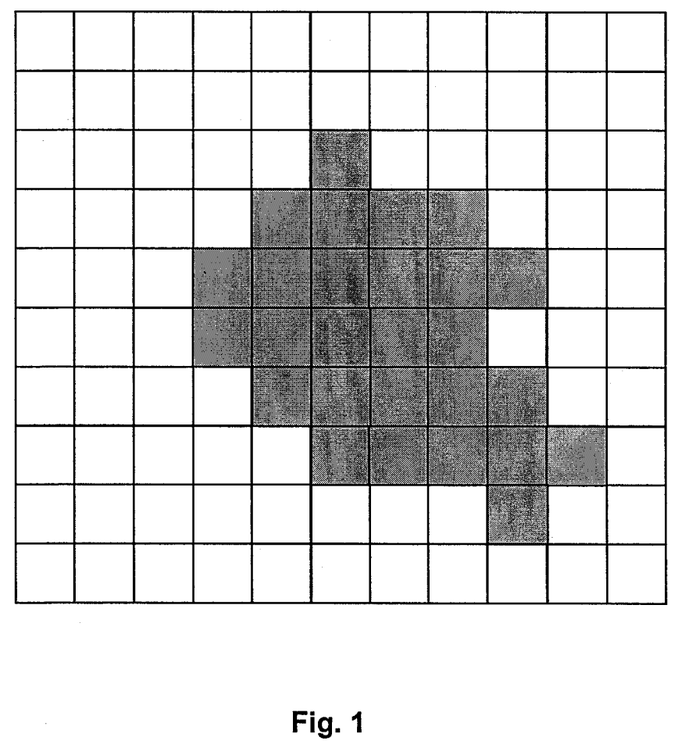
FIG. 1 shows a facies map of a petroleum reservoir.

A reservoir model has a grid with N dimensions (N>0 and generally two or three) in which each cell is assigned the value of a property characteristic of the zone being studied. It can be, for example, the porosity or the permeability distributed in a reservoir. FIG. 1 shows a facies map of a petroleum reservoir, making up a two-dimensional reservoir model. The grid pattern represents the cells. The grey cells represent a reservoir facies zone and the white cells represent a non-reservoir facies zone.

The value of a property characteristic of the zone being studied is referred to as a regionalized variable which is a continuous variable, spatially distributed, and representative of a physical phenomenon. From a mathematical point of view, the regionalized variable is simply a function z(u) taking a value at each point u (the cell of the grid) of a field of study D (the grid representative of the reservoir). However, the variation of the regionalized variable in this space is too irregular to be formalized by a mathematical equation. In fact, the regionalized variable represented by z(u) has both a global aspect relative to the spatial structure of the phenomenon under study and a random local aspect.

This random local aspect can be modelled by a random variable (VA). A random variable is a variable that can take on a number of realizations z according to a probability law. Continuous variables such as seismic attributes (acoustic impedance) or petrophysical properties (saturation, porosity, permeability) can be modelled by VAs. Therefore, at point u, the regionalized variable z(u) can be considered to be the realization of a random variable Z.

However, to properly represent the spatial variability of the regionalized variable, it must be possible to take into account the double aspect, both random and structured. One possible approach, of probabilistic type, involves the notion of random function. A random function (FA) is a set of random variables (VA) defined in a field of study D (the grid representative of the reservoir), that is $\{Z(u), u*D\}$, also denoted by Z(u). Thus, any group of sampled values $\{z(u_1), \ldots, z(u_n)\}$ can be considered to be a particular realization of random function $Z(u)=\{Z(u_1), \ldots, Z(u_n)\}$. Random function Z(u) allows accounting for both the locally random aspect (at u*, the regionalized variable z(u*) being a random variable) and the structured aspect (via the spatial probability law associated with random function Z(u)).

The realizations of a random function provide stochastic reservoir models. From such models, it is possible to appreciate the way the underground zone works under study. For example, simulation of the flows in a porous medium represented by numerical stochastic models allows, among other things, prediction of the reservoir production and optimizing its development by testing various scenarios.

Construction of a stochastic reservoir model can be described as follows:

First, static data are measured in the field (logging, measurements on samples taken in wells, seismic surveys, . . . ) and, dynamic data are measured (production data, well tests, breakthrough time, . . . ), whose distinctive feature is that they vary over time as a function of fluid flows in the reservoir, then, from the static data, a random function characterized by its covariance function (or similarly by its variogram), its variance and its mean is defined, a set of random numbers drawn independently of one another is defined: which can be, for example, a Gaussian white noise or uniform numbers. Thus, an independent random number per cell and per realization is obtained, finally, from a selected geostatistical simulator and from the set of random numbers, a random draw in the random function is performed, giving access to a (continuous or discrete) realization representing a possible image of the reservoir. Conventionally, the random draw is performed in a hierarchical context. First, the reservoir is randomly populated by a realization of the random function associated with the facies, conditionally to the facies measurements taken punctually. Then, the porosity is generated randomly on each facies which is conditionally to the porosity data obtained on the facies considered. The horizontal permeability is then simulated according to its associated random function, conditionally to the facies and to the porosities drawn before, and to the permeability measurements taken in the field. Finally, the reservoir is populated by a random realization of the vertical permeability, conditionally to all the previous simulations and to the permeability data obtained punctually.

At this stage, the dynamic data have not been considered. They are integrated in the reservoir models via an optimization or a calibration. An objective function measuring the difference between the dynamic data measured in the field and the corresponding responses simulated for the model considered is defined. The goal of the optimization procedure is to modify little by little this model so as to reduce the objective function. Parametrization techniques allow these modifications to be provided while preserving coherence with respect to the static data.

In the end, the modified models are coherent with respect to the static data and the dynamic data. It must be possible to update these models completely so that when new data are available the model has to be modified to account for the new data. The calibration and parametrization techniques are improving continuously. Consequently, reservoir engineers frequently need to go back over reservoir models elaborated and calibrated in the past. The goal is to refine these models and to update them with the data acquired since the time when the model had been initially elaborated.

However, an essential difficulty still remains when going back over numerical models elaborated in the past. In fact, to apply a method allowing refinement calibration of an existing realization, the number of random numbers which, when given to the geostatistical simulator, provides the numerical model (the realization) in question has to be known. Now, in general, this information no longer exists. Similarly, the variogram (or covariance) model characterizing the spatial variability in the underground zone of the represented attribute and necessary to characterize the random function is no longer known. The latter point is less important insofar as a study of the existing numerical model can allow to find this variogram again.

French Patent 2,869,421 discloses a method for reconstruction of numerical stochastic models, that is, for a previously determined random function, to identify a set of random numbers which, given as input data to a geostatistical simulator, provides a realization similar to the numerical model being considered. However, this technique applies to continuous variables representative, for example, of the porosity, that is to the case of a reservoir comprising a single facies.

SUMMARY OF THE INVENTION

The invention relates to an alternative method of developing petroleum reservoirs, wherein measurements are taken, a map representative of the properties of the reservoir is updated in order to account for the measurements, and the reservoir development scheme is modified according to the updated map. The method is based on an identification of a set of random numbers used to generate the initial facies map which, given as input data to a geostatistical simulator, leads to a facies realization similar to that of the initial map.

The invention is a method of developing a petroleum reservoir according to a given development scheme, from a facies map representative of the reservoir, a method wherein measurements allowing better characterization of reservoir are taken. The method comprises the following:
selecting a geostatistical simulator comprising a random number generation algorithm;
identifying a set of random numbers which are provided to the geostatistical simulator to provide a facies representation identical to the map, by inverting the random number generation algorithm;
modifying the map to take account for the measurements, by performing a geostatistical simulation constrained by the measurements with the geostatistical simulator and of the set of random numbers;
adjusting the reservoir development scheme by accounting for the modified map; and
developing the reservoir by using the modified development scheme.

The measurements can be selected from among the following data: logs, core analysis data and production data.

The geostatistical simulator can be selected from among the following simulators a simulator using the sequential indicator simulation method, a simulator using the truncated Gaussian method and a simulator using the pluri-Gaussian method.

According to a first embodiment of the invention, the geostatistical simulator is a simulator using the sequential indicator simulation method, the map is a grid of each cell which has a facies value V, $V=(V_1, \ldots, V_n)$ and a set of random numbers, $p_1, \ldots, p_n$, is identified by carrying out the following:

i. converting the measurements $v_\alpha$ to an indicator vector;
ii. constructing a random path visiting all the cells of the grid; and
iii. in each cell i of the path carrying out the following:
(a) estimating an occurrence probability of each facies by an indicator kriging technique using as conditional data indicator vector to which previously simulated facies $V_{<i}=(V_1, \ldots, V_{i-1})$ are added;
(b) normalizing occurrence probability; and
(c) constructing an empirical distribution function $F_{V_i|v_\alpha V_{<i}}$ associated with the occurrence probability; and
(d) generating a random number $p_i$ according to a uniform law in the interval $[F_{V_i|v_\alpha V_{<i}}(V_i-1), F_{V_i|v_\alpha V_{<i}}(V_i)]$.

According to a second embodiment of the invention, the geostatistical simulator is a simulator using the truncated Gaussian method, the map is a grid of each cell having a facies value V, $V=(V_1, \ldots, V_n)$, the set of random numbers is identified by carrying out the following:
generating a realization Y of a stationary Gaussian field of given correlogram $\rho(h)$ which, when the realization Y is truncated with given thresholds, produces a facies representation identical to the map; and
identifying the set of random numbers by determining a set of random numbers allowing reconstruction by stochastic simulation realization Y using a random number identification technique applicable to continuous data.

According to this second embodiment, realization Y can be generated by applying the following sequential approach:
i. constructing a random path visiting all the cells of the grid; and
ii. in each cell i:
(a) calculating a probability density function $g_i(y_i|C_{<i}, Y_{<i})$ of $Y_i$ knowing constraints $C_{<i}=\{a_{v_{j-1}} \leq Y_j < a_{v_j}, j=1, \ldots, i\}$ and values $Y_{<i}=(Y_1, \ldots, Y_{i-1})$ simulated on previously visited cells by using the following formula:

$$g_i(y_i \mid C_{<i}, Y_{<i}) = \frac{\frac{1}{\hat{\sigma}_i}\rho\left(\frac{y_i - \hat{\mu}_i}{\hat{\sigma}_i}\right)}{\Phi\left(\frac{a_{v_i-1} - \hat{\mu}_i}{\hat{\sigma}_i}\right) - \Phi\left(\frac{a_{v_i} - \hat{\mu}_i}{\hat{\sigma}_i}\right)} 1\{a_{v_{j-1}} \leq Y_j < a_{v_j}, \quad j=1, \ldots, i\}$$

with $\hat{\mu}_i$ and $\hat{\sigma}_i$, mean and standard deviation of simple kriging of $Y_i$ knowing $Y_{<i}$, and (b) generating a realization according to the probability density function.

According to a third embodiment of the invention, the geostatistical simulator is a simulator using the pluri-Gaussian method, the map is a grid with each cell having a facies value V, $V=(V_1, \ldots, V_n)$, and the set of random numbers is identified by carrying out the following:

generating two realizations $Y^1$ and $Y^2$ of standard stationary Gaussian fields of given correlograms $\rho_1(h)$ and $\rho_2(h)$ which, when the realizations $Y^1$ and $Y^2$ are combined with a given threshold mask, produce a facies representation identical to the map; and identifying the set of random numbers by determining two sets of random numbers allowing reconstruction by stochastic simulation realizations $Y^1$ and $Y^2$ by using a random number identification technique applicable to continuous data with the set of random numbers being the two sets of random numbers.

According to this third embodiment, realizations $Y^1$ and $Y^2$ can be generated by applying the sequential approach as follows:

i. constructing a random path visiting all the cells of the grid;

ii. in each cell i:

(a) calculating a probability density function $g(y_i^1, y_i^2 | C_{<i}, Y_{<i}^1, Y_{<i}^2)$ of $(Y_{<i}^1, Y_{<i}^2)$ knowing constraints $C_{<i} = \{(Y_j^1, Y_j^2) \in \epsilon_{V_j}, j=1, \ldots, i\}$ and values $(Y_{<i}^1, Y_{<i}^2)$ simulated on previously visited cells by using the following formula:

$$g(y_i^1, y_i^2 | C_{<i}, Y_{<i}^1, Y_{<i}^2) = \sum_{j=1}^{n_{V_i}} \varepsilon_j g_j^1(y_i^1) g_j^2(y_i^2)$$

with $$g_j^1(y_i^1) = \frac{\frac{1}{\hat{\sigma}_i^{(1)}} \rho\left(\frac{y_i^1 - \hat{\mu}_i^{(1)}}{\hat{\sigma}_i^{(1)}}\right)}{\Phi\left(\frac{b_{j,v_i} - \hat{\mu}_i^{(1)}}{\hat{\sigma}_i^{(1)}}\right) - \Phi\left(\frac{a_{j,v_i} - \hat{\mu}_i^{(1)}}{\hat{\sigma}_i^{(1)}}\right)}$$

$$g_j^2(y_i^2) = \frac{\frac{1}{\hat{\sigma}_i^{(2)}} \rho\left(\frac{y_i^2 - \hat{\mu}_i^{(2)}}{\hat{\sigma}_i^{(2)}}\right)}{\Phi\left(\frac{d_{j,v_i} - \hat{\mu}_i^{(2)}}{\hat{\sigma}_i^{(2)}}\right) - \Phi\left(\frac{c_{j,v_i} - \hat{\mu}_i^{(2)}}{\hat{\sigma}_i^{(2)}}\right)}$$

where $\varepsilon_j = |\epsilon_{j,V_i}|/|\epsilon_{V_i}|$ and $\hat{\mu}_i^{(x)}$ and $\hat{\sigma}_i^{(x)}$ are the mean and the standard deviation of simple kriging of $Y_i^x$ knowing $Y_{<i}^x$, and x=1 or x=2;

(b) generating a realization according to the probability density function.

Finally, according to the invention, the map can be modified by applying a gradual deformation method.

BRIEF DESCRIPTION OF THE DRAWINGS

Other features and advantages of the method according to the invention will be clear from reading the description hereafter of embodiments given by way of non limitative examples, with reference to the accompanying figures wherein.

DETAILED DESCRIPTION OF THE INVENTION

Figure 2:
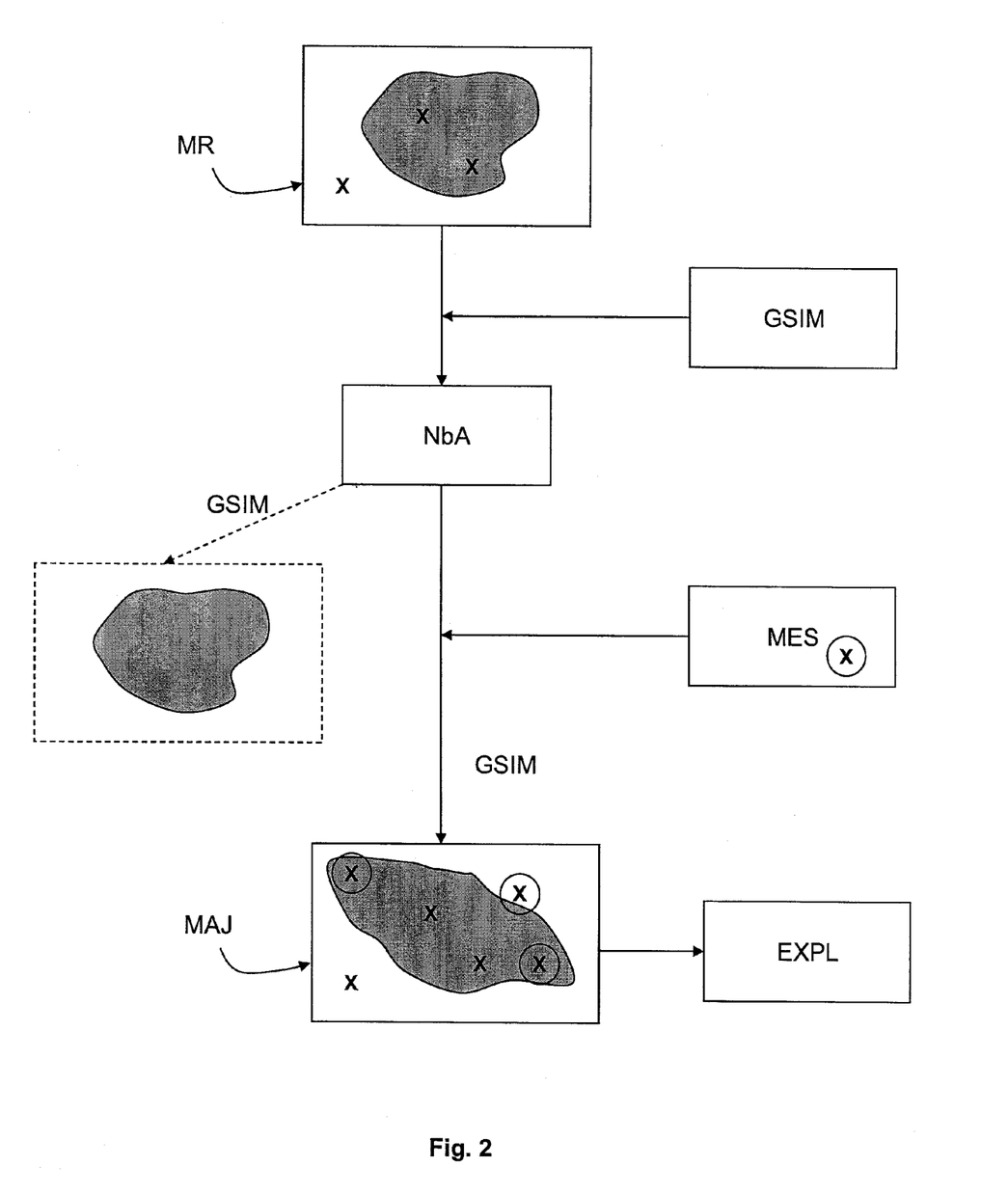
FIG. 2 illustrates the stages of the method according to the invention.

The method according to the invention allows development of a petroleum reservoir for which a map (MR) representative of the reservoir facies is available. This map can comprise several facies including lithologic facies such as limestone, sandstone, clay lithologies, etc., or seismic facies which are well known. FIG. 2 illustrates the stages of the method according to the invention. It comprises the following:

1. Taking measurements within the reservoir (MES);
2. Selecting a geostatistical simulator (GSIM);
3. Identifying a set of random numbers which are provided to the selected geostatistical simulator for providing a facies representation similar to that of the initial map (NbA);
4. Updating the map to account for the measurements (MAJ); and
5. Modifying the reservoir development scheme and developing the reservoir with this updated scheme (EXPL).

1. Taking Measurements within the Reservoir

During development of a reservoir, new measurements allowing better characterization of the reservoir and therefore optimizing the development thereof are taken. For example:

Static data: measurements on samples taken in wells (such as cores), seismic survey data and/or logs, providing knowledge of the porosity or the permeability for example all along the well where the logs are achieved; and Dynamic data: production data, well tests, breakthrough time, . . . , whose distinctive feature is that they vary in the course of time as a function of fluid flows in the reservoir. The production data allow history matching to be performed. As long as the reservoir is developed, new time-varying production data are collected, such as, for example, the pressures in the wells or oil, water or gas flow rates.

2. Selecting a Geostatistical Simulator

The second stage of the method according to the invention selects a geostatistical simulator. Geostatistical simulation methods produce random function realizations from a set of random numbers such as for example a Gaussian white noise or independent uniform numbers. There are many geostatistical simulators for generating a facies map. The following methods are preferably used within the context of two-point statistics:

the sequential indicator simulation described in: Goovaerts, P., Geostatistics for Natural Resources Evaluation, Oxford University Press, New York (1997), the truncated Gaussian method described in: Galli, A., Beucher, H., Le Loc'h, G. and Doligez, B. (1994), The Pros and the Cons of the Truncated Gaussian Method, Geostatistical Simulations, 217-233, and the pluri-Gaussian method described in: Le Loc'h, G. and Galli, A. (1996), Truncated Plurigaussian Method Theoretical and Practical Point of View, Geostatistics Wollongong '96 1, E. Y. Baafi and N. A. Schofields eds, Kluwe, 211-222.

All these procedures involve the generation of random numbers which, after being converted according to a technique specific to each one of them, allow generation of the facies map.

The simulation procedure of a facies map $V=(V_1, \ldots, V_n)$ conditionally for observations $\{v_\alpha, a=1, \ldots, n_\alpha\}$, for each one of these three geostatistical simulators, can be recalled. For all these techniques, the common notations are as follows:

$D=\{(x_i, y_i, z_i), i=1, \ldots, n\}$ is the discretized subdomain of $R^3$ corresponding to the center of the cells of the reservoir grid;

K is the number of different facies present in the reservoir;

For $\alpha=1, \ldots, n_\alpha$, $v_\alpha \in \{1, \ldots, K\}$ designates the facies observed at point $(x_\alpha, y_\alpha, z_\alpha)$;

For $i=1, \ldots, n$, $V_i \in \{1, \ldots, K\}$ designates the facies simulated at point $(x_i, y_i, z_i)$;

$$\varphi(x) = \frac{1}{\sqrt{2\pi}} e^{-\frac{x^2}{2}}$$

is the probability density function of the standard Gaussian law; and $\Phi(x) = \int_{-\infty}^{x} \varphi(t) dt$ is the distribution function of the standard Gaussian law.

Sequential Indicator Simulation (SISim)

The simulation procedure is as follows:

i. Converting observations (measurements) $v_\alpha$ to a vector of K indicators, defined by:

$$i_{\alpha,k} = \begin{cases} 1 & \text{if } v_\alpha = k \\ 0 & \text{otherwise} \end{cases}$$

for $k = 1, \ldots, K$.

ii. Constructing a random path visiting all the cells of the reservoir grid, except for those for which an observation (measurement or cell already simulated) $v_\alpha$ is available iii. In each cell i of the path:
  (a) estimating the occurrence probability of each facies k by using an indicator kriging technique. The conditional data are the values of the indicators defined in (1) to which $V_{<i}=(V_1, \ldots, V_{i-1})$, the previously simulated facies, are added;
  (b) correcting these estimated probabilities;
  (c) constructing the empirical distribution function $F_{V_i|v_\alpha V_{<i}}(t)$ associated with the probabilities;
  (d) generating a random number $p_i$ according to the uniform law in interval [0,1];
  (e) the facies simulated at point i is the one that corresponds to the interval to which p belongs wherein $V_i = k^*$ if $F_{V_i|v_\alpha V_{<i}}(k^*-1) < p \le F_{V_i|v_\alpha V_{<i}}(k^*)$;

(f) movement to the next cell on the path is performed and (a) to (d) are repeated.

Simulation Using the Truncated Gaussian Method

Simulation of a facies map by the truncated Gaussian method generates facies by truncating a realization Y (x, y, z) of a stationary Gaussian field of zero mean, of unit variance and of correlogram ρ(h) where h is the Euclidean distance between two points. Realization Y(x, y, z) can be obtained by Gaussian sequential simulation as described in the following document: Goovaerts, P., *Geostatistics for Natural Resources Evaluation*, Oxford University Press, New York (1997); or by the FFT-MA algorithm introduced in the following article: Le Ravale M., Noetinger B. and Hu L. Y., The FFT Moving Average (FFT-MA) Generator: An Efficient Numerical Method for Generating and Conditioning Gaussian Simulations, *Math. Geol.*, 32(6) (2000).

Generically, the facies map is given by the following relation. In each cell i of the grid, the following is defined:

$$V(x_i, y_i, z_i) = \sum_{k=1}^{K} k \mathbf{1}\{a_{k-1} \le Y(x_i, y_i, z_i) < a_k\}$$

where $-\infty = a_0 < a_1 < \ldots < a_{k-1} < a_k < \ldots < a_K = +\infty$ are the truncation thresholds. Their value is determined from the proportions of each facies. These proportions can vary according to the cells (non-stationary case) or be constant over the entire grid (stationary case). By denoting by $\pi_k$ the proportion of facies k for $k=1, \ldots, K$, the relationship between the thresholds and the proportions is as follows:

$$a_k(x, y, z) = \Phi^{-1}\left(\sum_{j=1}^{k} \pi_j(x, y, z)\right)$$

for $k=1, \ldots, K$. $\Phi^{-1}$ designates the inverse of the distribution function of the standard normal law. The simulation procedure is as follows:

i. Calculating the thresholds from the facies proportions;

ii. Generating a realization Y of a Gaussian field according to one of the two aforementioned methods; and iii. Identifying the facies to be assigned to a cell according to the interval to which the value of Y generated in this cell belongs.

If facies observations $\{v_\alpha, a=1, \ldots, n_\alpha\}$ are available, realization Y(x, y, z) is replaced by its conditional version $Y(x, y, z) | \{a_{v_\alpha-1} \le Y_\alpha < a_{v_\alpha}, a=1, \ldots, n_\alpha\}$ that can be generated according to the method described in the following article:

Freulon, X., and de Fouquet, C., Conditioning a Gaussian Model with Inequalities, in *Geostatistics Troia '92*, A. Soares, ed., Kluwer Academic Publishers, Dordrecht, The Netherlands, 201-212 (1993).

Simulation Using the Pluri-Gaussian Method

The pluri-Gaussian method is an extension of the truncated Gaussian method in the sense that it truncates several Gaussian fields. This procedure has been introduced to add some flexibility to the modelling of transitions between facies by allowing modelling a large variety of geological environments. The method is described here in the simplest case of multi-Gaussian generation of only two independent Gaussian fields being considered. Extension of the method to the case of several Gaussian fields that can be correlated is direct.

Two independent standard stationary Gaussian fields $Y^1$ and $Y^2$ of respective correlograms $\rho_1(h)$ and $\rho_2(h)$ are considered. The transitions between facies are defined by truncation rules expressed in the form of a threshold mask. The principal axes of the mask correspond to the values taken by $Y^1$ and $Y^2$. Regions which are often rectangular, divide space $(Y^1, Y^2)$ into subdomains with each subdomain being associated with a facies. The bounds of these subdomains are the thresholds used for truncating $Y^1$ and $Y^2$. The surface area of the subdomains, and consequently the thresholds, depends on the proportions of the facies. In the case of non-stationary proportions, the threshold mask can evolve depending on the cell being considered.

Generically, by denoting by $\epsilon_k$ the rectangular region associated with facies k for $k=1, \ldots, K$, the facies map is defined by:

$$V(x, y, z) = \sum_{k=1}^{K} k1\{(Y^1(x, y, z), Y^2(x, y, z)) \in \varepsilon_k\}$$

Conventionally, regions $\varepsilon_k$ are assumed to be rectangular. It is also possible to consider subdomains associated with a given facies in the form of the union of several rectangular regions:

$$\varepsilon_k = \bigcup_{j=1}^{n_k} \varepsilon_{j,k}$$

with $$\varepsilon_{j,k} = \{(x, y) \in R^2, a_{j,k} \leq x < b_{j,k}, c_{j,k} \leq y < d_{j,k}\}$$

Wherein $\alpha_{|i|,|k|}$ is a threshold, $|x|,|v|$ is a threshold value, $b_{|i|,|k|}$ is a threshold, $c_{|i|,|k|}$ is a threshold value, and $d_{|i|,|k|}$ is a threshold value.

The simulation procedure thus is as follows:
i. Calculating the thresholds from the facies proportions and the threshold mask.
ii. Generating two realizations $Y^1$ and $Y^2$ of Gaussian fields by sequential Gaussian simulation or by the FFT-MA method.
iii. Identifying the facies to be assigned to a cell according to the values of $Y^1$ and $Y^2$ generated for this cell.

3. Identifying a Set of Random Numbers for Reconstructing the Initial Map

The third stage of the method according to the invention reconstructs the facies map from the generation procedure selected in stage 2. It identifies random numbers which, when used in the generation procedure, produce the initial facies map which is considered.

According to the invention, a set of random numbers (NbA) allowing reconstruction of the initial map by inverting the random number generation algorithm of the geostatistical simulator (GSIM) that is selected is identified. The initial map is considered to have been obtained by the geostatistical simulator. The result (F) of this simulator is known for each point of the map and it is the initial map since it is the initial map itself. This result then just has to be inverted:

GSIM(NbA)=F→NbA=GSIM$^{-1}$(F)

This inversion procedure is illustrated for each geostatistical simulator of stage 2.

Reconstruction for the Sequential Indicator Simulation

The reconstruction method provided here was a facies map $V=(V_1, \ldots, V_n)$, to reconstruct a set of random numbers $(p_1, \ldots, p_n)$ which, when used in the SISim procedure, produce the original facies map $V=(V_1, \ldots, V_n)$. The method provided is as follows:

(1) Converting observations $v_\alpha$ (measurement and/or cell already simulated) to a vector of K indicators, defined by:

$$i_{\alpha,k} = \begin{cases} 1 & \text{if } v_\alpha = k \\ 0 & \text{otherwise} \end{cases}$$

for $k = 1, \ldots, K$.;

(2) Constructing a random path visiting all the cells of the grid;

(3) In each cell i of the path;
   (a) Estimating the occurrence probability of each facies k by using an indicator kriging technique. The conditional data are the values of the indicators defined in (1) to which $V_{<i}=(V_1, \ldots, V_{i-1})$ is added in the previously simulated facies;
   (b) Normalizing these estimated probabilities';
   (c) Constructing the empirical distribution function $F_{V_i|v_\alpha V_{<i}}(t)$ associated with these probabilities;
   (d) Generating a random number $p_i$ according to the uniform law on interval $\lfloor F_{V_i|v_\alpha V_{<i}}(V_i-1), F_{V_i|v_\alpha V_{<i}}(V_i) \rfloor$; and
   (e) Moving to the next cell on the path and repeating (a) to (d).

By construction during (d), vector $(p_1, \ldots, p_n)$ is asymptotically distributed according to a uniform law on interval [0]. If the same random path is used and the uniform random numbers given by the method in the SISim procedure, it is certain to generate the same facies map as the original one. Thus, the set of random numbers $p_i$ calculated in (d) constitutes the set of random numbers that are sought.

The solution provided by the method of the invention is not unique: other random numbers and other paths can generate the same facies map.

Reconstruction for the Truncated Gaussian

The reconstruction method provided is intended, from a known facies map $V=(V_1, \ldots, V_n)$, to generate a realization Y of a standard stationary Gaussian field of given correlogram $\rho(h)$ which, when truncated with thresholds $\{a_k, k=1, \ldots, K\}$, produces the same facies map as the original one. From a statistical point of view, generating a realization of such a Gaussian field is equivalent to generating a sample of a standard multinormal vector $(Y_1, \ldots, Y_n)$ conditioned by $\{a_{V_i-1} \leq Y_i < a_{V_i}, i=1, \ldots, n\}$. The distribution of this vector is known as truncated multinormal distribution. It is not possible to generate a sample of this law in one attempt. Our method uses the following sequential approach:

(1) Constructing a random path visiting all the cells of the grid;
(2) In each cell i, the probability density function of $Y_i$, knowing constraints $C_{<i}=\{a_{v_j} \leq Y_j < a_{v_j}, j=1, \ldots, i\}$ and values $Y_{<i}=(Y_1, \ldots, Y_{i-1})$ simulated on the previously visited cells, is:

$$g_i(y_i | C_{<i}, Y_{<i}) = \frac{\frac{1}{\hat{\sigma}_i}\rho\left(\frac{y_i - \hat{\mu}_i}{\hat{\sigma}_i}\right)}{\Phi\left(\frac{a_{v_i-1} - \hat{\mu}_i}{\hat{\sigma}_i}\right) - \Phi\left(\frac{a_{v_i} - \hat{\mu}_i}{\hat{\sigma}_i}\right)} 1\{a_{v_{j-1}} \leq Y_j < a_{v_j}, j=1, \ldots, i\}$$

$\hat{\mu}_i$ and $\hat{\sigma}_i$ are the mean and the standard deviation of simple kriging of $Y_i$, knowing $Y_{<i}$;

(3) Generating a realization according to this probability density function using one of the usual algorithms, described for example in the following documents:

J. Geweke, Efficient Simulation from the Multivariant Normal and Student t-Distribution Subject to Linear Constraints, *Computing Science and Statistics: Proceedings of the Twenty-Third Symposium on the Interface* (1991) 571-578

V. Mazet, D. Brie et J. Idier, Simuler Une Distribution Normale à Support Positif à Partir de Plusieurs Lois Candidates, *GRETSI*, Louvain-la-neuve, Belgique (2005)

P. J. Fernandez, P. A. Ferrari and S. Grynberg, Perfectly Random Sampling of Truncated Multinormal Distributions, *Adv. in Appl. Probab*, 39 (2007) 973-990

(4) Moving to the next cell and repeating (2) to (3) until all the cells have been visited; and (5) When realization Y is known with Y being a continuous realization of given correlogram, a random number identification technique applicable to continuous data (and not discrete data such as the facies data) is used to identify a set of random numbers allowing reconstruction of the realization Y by stochastic simulation.

Advantageously, identification of the random numbers comprises using one of the following techniques, described in French Patent 2,869,421: optimization, relaxation, filtering, sequential method and a combination of these techniques.

The identification by optimization technique comprises minimization of an objective function measuring the difference between the numerical stochastic model ($y_{ref}$) and a simulated model (y). The gradient of the objective function with respect to the random numbers is used to reconstruct the model by optimization.

The identification by a filtering technique is based on the Wiener filter. It is suitable for geostatistical simulators that depend on a convolution product. This algorithm allows, in a single iteration, reconstruction of continuous models. In the spectral domain, the Fourier transform is written as the product of the transform of the Gaussian white noise (that is the set of random numbers) by a function F and the square root of the power spectrum. Implementation of the Wiener filter involves replacing the inverse of F, $F^{-1}$, by $\overline{F}/(|F|^2+\epsilon)$ where $\epsilon$ is a sufficiently small constant. Gaussian white noise z is then estimated from:

$$z = TF^{-1}\left(\frac{\overline{F}}{(|F|^2 + \varepsilon)} Y_{ref}\right)$$

where $TF^{-1}$ means: inverse Fourier transform.

By construction, the realization obtained by use of this method meets the threshold constraints imposed and it therefore produces, after truncation, the same facies map as the original one. The method provided produces a solution that is not unique and that can differ from the reference facies realization.

Reconstruction for the Pluri-Gaussian

The reconstruction method is similar to the method provided in the case of the truncated Gaussian in that two realizations $Y^1$ et $Y^2$ are generated of standard stationary Gaussian fields of known correlograms $\rho_1(h)$ and $\rho_2(h)$ which, when combined with the given threshold mask, produce a facies map similar to the original one ($V_1, \ldots, V_n$). The method provided is here again based on a sequential approach:

(1) Constructing a random path visiting all the cells of the grid;

(2) In each cell i, the probability density function of ($Y_i^1$, $Y_i^2$), knowing constraints $C_{<i}=\{Y_j^1, Y_j^2)\in\epsilon_{V_j}, j=1,\ldots,i\}$ and values ($Y_{<i}^1, Y_{<i}^2$) simulated on the previously visited cells, is the following mixture:

$$g(y_i^1, y_i^2 \mid C_{<i}, Y_{<i}^1, Y_{<i}^2) = \sum_{j=1}^{n_{V_i}} \varepsilon_j g_j^1(y_i^1) g_j^2(y_i^2)$$

with:

$$g_j^1(y_i^1) = \frac{\frac{1}{\hat{\sigma}_i^{(1)}}\rho\left(\frac{y_i^1 - \hat{\mu}_i^{(1)}}{\hat{\sigma}_i^{(1)}}\right)}{\Phi\left(\frac{b_{j,V_i} - \hat{\mu}_i^{(1)}}{\hat{\sigma}_i^{(1)}}\right) - \Phi\left(\frac{a_{j,V_i} - \hat{\mu}_i^{(1)}}{\hat{\sigma}_i^{(1)}}\right)}$$

$$g_j^2(y_i^2) = \frac{\frac{1}{\hat{\sigma}_i^{(2)}}\rho\left(\frac{y_i^2 - \hat{\mu}_i^{(2)}}{\hat{\sigma}_i^{(2)}}\right)}{\Phi\left(\frac{d_{j,V_i} - \hat{\mu}_i^{(2)}}{\hat{\sigma}_i^{(2)}}\right) - \Phi\left(\frac{c_{j,V_i} - \hat{\mu}_i^{(2)}}{\hat{\sigma}_i^{(2)}}\right)}$$

where $\epsilon_j=|\epsilon_{j,V_i}|/|\epsilon_{V_i}|$ and $\hat{\mu}_i^{(1)}$ et $\hat{\sigma}_i^{(1)}$ (resp. $\hat{\mu}_i^{(2)}$ and $\hat{\sigma}_i^{(2)}$) are the mean and the standard deviation of simple kriging of $Y_i^1$ (resp. $Y_i^2$) knowing $Y_{<i}^1$ (resp. $Y_{<i}^2$);

(3) Generating a realization according to this probability density function;

(4) Moving to the next cell and repeating stages (2) to (3) until all the cells have been visited;

(5) When realizations Y1 and Y2 are known, Y1 and Y2 are continuous realizations of known correlograms, a random number identification technique applicable to continuous data (and not discrete data such as the facies data) is used to identify two sets of random numbers allowing reconstruction by stochastic simulation, of realization Y1 and realization Y2.

In the case of truncated Gaussians and pluri-Gaussians, the simulation method and therefore the associated reconstruction method involves Gaussian fields whose correlogram is assumed to be known. If this is not the case, it is necessary to estimate them from the facies map. The mathematical relation between the variogram of the facies map and the variogram of the Gaussian field(s) used for its generation cannot be inverted, as noted in the following document:

J.-P. Chilès and P. Delfiner, Geostatistics. Modeling Spatial Uncertainty, Wiley Series in Probability and Statistics (1999).

The approach that is used provides a series of variograms in which the one that is selected produces the experimental variogram that is the closest to the one observed on the facies map.

The purpose of identifying the set of random numbers is to be able to modify the initial map so that it meets the new measurements.

4. Updating the Map to Account for the Measurements

Now that a geostatistical simulator and a set of random numbers is obtained which, when applied to the simulator, allows reconstruction of the initial map, it is possible to modify the map with usual methods such as:

the gradual deformation method which is a geostatistical parametrization technique meeting engineers' needs and presented in the following article:

Hu, L.-Y., 2000, Gradual Deformation and Iterative Calibration of Gaussian-related Stochastic Models, Math. Geol., 32(1), 87-108.).

It makes it possible in fact to resume the study of a reservoir and to modify it partially in zones where new data are available, as described in the following document:

Le Ravalec-Dupin, M., Noetinger, B., Hu, L.-Y., and Blanc, G., 2001, Conditioning to Dynamic Data: An Improved Zonation Approach, Petroleum Geosciences, 7, S9-S16.

In order to locally deform a zone of the reservoir, the gradual deformation method is applied to the random numbers of the cells included in this zone. All of the numbers of the target zone and those of the host rock domain are then supplied to the stochastic simulator in order to obtain a new realization representing the reservoir. This new realization differs from the initial realization in the target zone and in a transition zone that surrounds the target zone. The advantage of returning random numbers for gradual deformation is that the continuity of the realization is preserved.

5. Modifying the Reservoir Development Scheme and Developing the Reservoir

Once the facies map is updated from the newly acquired measurements, the reservoir development scheme is reconstructed.

Since the updated facies map is coherent with all the available data, it is used to predict fluid displacements in the reservoir according to various production scenarios. It is then possible, for this facies map, to try to optimize the future oil production by adjusting for example the position of the wells, the number of wells, etc.

The reservoir is finally developed using the thus adjusted development scheme. Drilling operations can for example be carried out, or technical production or injection parameters can be modified.

Figure 3:
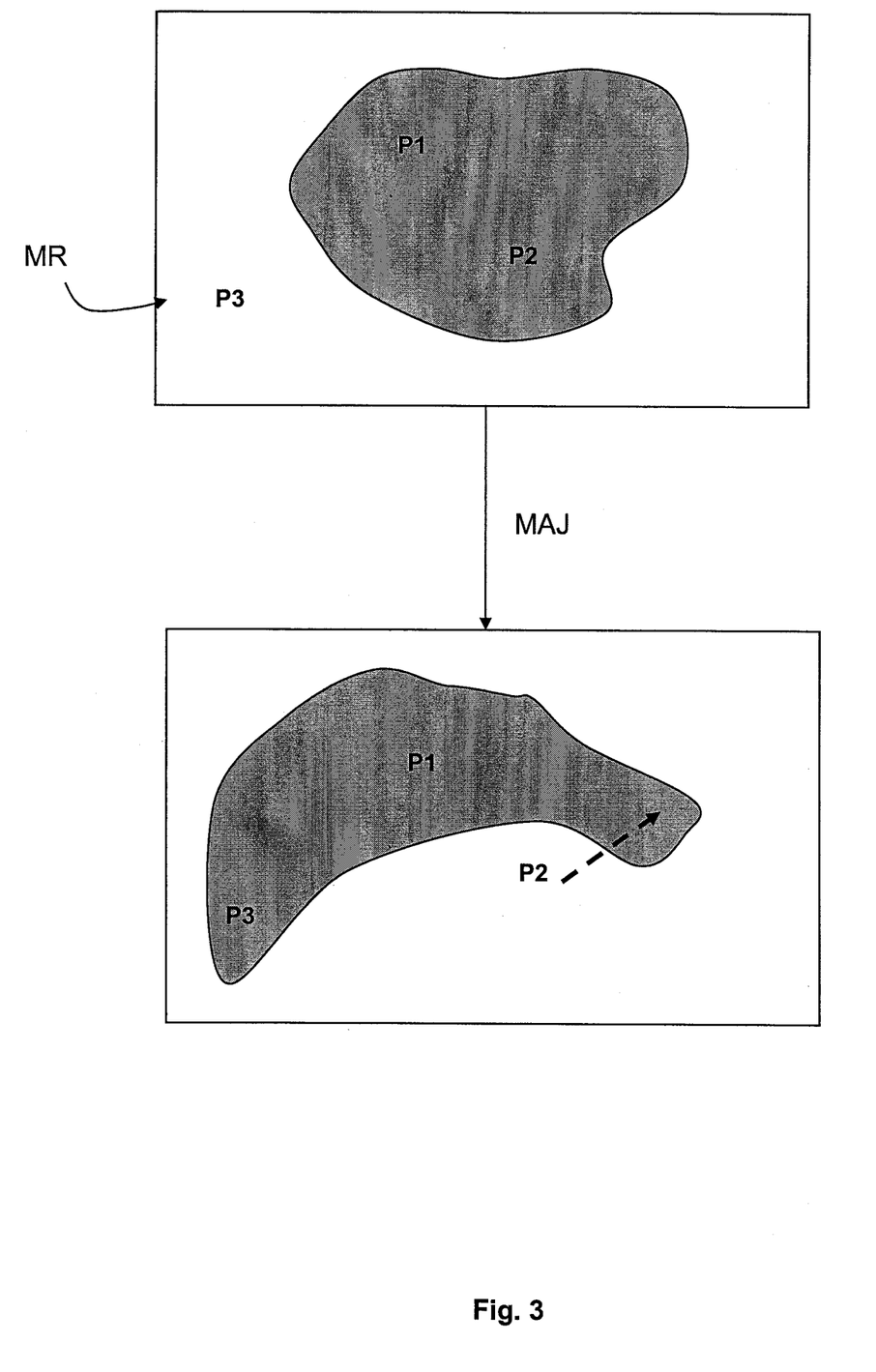
FIG. 3 illustrates the necessary development scheme adjustment after modification of the facies map which accounts for the new measurements.

FIG. 3 illustrates the necessary development scheme adjustment due to the modification of the facies map which accounts for the new measurements. In fact, in the initial reservoir development scheme (in grey), well P2 was supposed to reach the reservoir and, conversely, well P3 was supposed to be drilled outside the reservoir. Therefore, for example, well P3 was not under production whereas well P2 had to be drilled deeper so as to reach the reservoir. According to the new map, the trajectory of P2 is going to be modified so that it actually reaches the reservoir. It is also possible to continue drilling at the level of P3 so as to reach the reservoir and bring P3 into production.

The invention claimed is:

1. A method of developing a petroleum reservoir according to a development scheme, from a facies map representative of the reservoir using measurements from the reservoir allowing better characterization of the reservoir, comprising:

selecting a geostatistical simulator comprising a random number generation algorithm;

identifying a set of random numbers which are provided to the geostatistical simulator to provide a facies representation identical to the map, by inverting the random number generation algorithm;

modifying the facies map to account for the measurements, by carrying out a geostatistical simulation constrained by the measurements, by using the geostatistical simulator and the set of random numbers;

adjusting the reservoir development scheme by accounting for the modified map; and developing the reservoir using the modified development scheme; and wherein the geostatistical simulator is a simulator using a sequential indicator simulation with a map being a grid in which each cell has a facies value V, $V=(V_1, \ldots, V_n)$, and a set of random numbers, $P_1, \ldots, P_n$, is identified by:

i. converting the measurements to an indictor vector $V_\alpha$ defined with the measurements;

ii. constructing a random path by visiting all the cells of the grid; and iii. in each cell i of the path:

(a) estimating an occurrence probability of each facies by an indicator kriging using as conditional data the indicator vector to which previously simulated facies $V_{<1}$ being a vector with the previously simulated facies before the cell i; with $V_{<1}=(V_1, \ldots, V_{i-1})$ being added;

(b) normalizing the occurrence probability;

(c) constructing an empirical distribution function $F_{V_1|v_\alpha v_{<1}}$ associated with the occurrence probability wherein $F_{V_1|v_\alpha v_{<1}}$ is an empirical function of $V_i$ knowing the product $V_\alpha V_{<1}$; and (d) generating a random number $p_1$ according to a uniform law in an interval $[F_{V_i|v_\alpha v_{<1}}(V_i-1), F_{V_i|v_\alpha v_{<1}}(V_i)]$.

2. A method as claimed in claim 1, wherein the measurements are selected from logs, core analysis data and production data.

3. A method as claimed in claim 1, wherein the map is modified by a gradual deformation.

4. A method as claimed in claim 2, wherein the map is modified by a gradual deformation.

* * * * *